United States Patent
Huebler

(10) Patent No.: US 6,907,409 B1
(45) Date of Patent: Jun. 14, 2005

(54) METHOD AND ARRANGEMENT FOR DETERMINING A WEIGHT WITH A DYNAMIC SCALE

(75) Inventor: Uwe Huebler, Berlin (DE)

(73) Assignee: Francotyp-Postalia AG & Co. (DE)

( * ) Notice: Subject to any disclaimer, the term of this patent is extended or adjusted under 35 U.S.C. 154(b) by 0 days.

(21) Appl. No.: 09/458,000

(22) Filed: Dec. 10, 1999

(30) Foreign Application Priority Data

Dec. 18, 1998 (DE) .......................... 198 60 294

(51) Int. Cl.$^7$ ...................... G01G 19/40; G01G 19/413; G06F 17/60

(52) U.S. Cl. .................. 705/415; 705/407; 705/414; 705/416; 177/185; 177/25.15; 235/383

(58) Field of Search ................ 705/406, 402, 705/60, 407, 414, 415, 400, 401, 416; 177/1, 185, 25.15, 121, 145; 235/383

(56) References Cited

U.S. PATENT DOCUMENTS

| | | | |
|---|---|---|---|
| 4,753,432 A | | 6/1988 | Freeman |
| 4,787,048 A | | 11/1988 | Freeman et al. |
| 4,858,709 A | | 8/1989 | Stahl |
| 4,956,782 A | | 9/1990 | Freeman et al. |
| 5,448,641 A | * | 9/1995 | Pintsov et al. ............. 380/51 |
| 5,991,409 A | * | 11/1999 | Windel et al. ............. 380/23 |
| 6,064,994 A | * | 5/2000 | Kubatzki et al. .......... 705/410 |
| 6,418,422 B1 | * | 7/2002 | Guenther et al. .......... 705/401 |

FOREIGN PATENT DOCUMENTS

| | | | |
|---|---|---|---|
| EP | 0 514 107 | | 11/1992 |
| FR | 2 700 042 | | 7/1994 |
| GB | 2094522 A | * | 2/1981 |
| GB | 2 195 460 | | 4/1988 |
| GB | 2 235 656 | | 3/1991 |

OTHER PUBLICATIONS

Unknown Author, "Neopost is Delivering Value Through Advanced Solutions as the National Postal Forum in Anaheim", Sep. 2000, Business Wire 3 pages.*

Postal Regs deliver innovation, Purchasing; Boston; Aug. 14, 1997; Susan Avery.*

"Leitfaden der Technischen Mechanik," Statik • Festigkeitslehre • Kinematik • Dynamik, Göldner et al., Chapter 6.2.2, Freie Schwingungen Gedämpfter Systeme (1986), pp. 599–606.

* cited by examiner

Primary Examiner—John G. Weiss
Assistant Examiner—Richard Woo
(74) Attorney, Agent, or Firm—Schiff Hardin LLP

(57) ABSTRACT

A dynamic scale has a conveyor, a weighing pan, a weighing cell, sensors and an electronic control unit that, in addition to controlling the conveyor means (4), implements an evaluation of a number measured weight values that are obtained from the weighing cell and performs a measured value correction on the basis of specific parameters, and supplies a corrected weight value to a postage meter machine via an interface. A method for a control of the conveyor, evaluation of the measured values from the weighing cell, and formulation of a valid output weight value includes an overload check that is made by comparing a measured weight value lying in the middle of the number of measured values to at least one overload limit value, and formation of a decision parameter from the measured values, in a validity check, for comparison to at least one shutoff criterion. If the validity check determines that the measured values from the weighing cell are valid, they are used to form the output weight value.

20 Claims, 8 Drawing Sheets

METHOD AND ARRANGEMENT FOR DETERMINING A WEIGHT WITH A DYNAMIC SCALE

BACKGROUND OF THE INVENTION

1. Field of the Invention

The present invention is directed to a method for determining a weight with a dynamic scale according to an arrangement for the implementation of the method particularly for fast mixed mail processing in a franking system. The method is suitable for users of a mail processing system with a dynamic scale and a postage-calculating postage meter machine, or a system with a dynamic postage-calculating scale and a franking unit.

2. Description of the Prior Art

A digital scale is disclosed in German PS 37 35 036, wherein the analog output signal of a weighing cell is converted into a digital signal in an analog-to-digital converter. A microprocessor compares this digital signal to a zero value in order to derive the weight.

U.S. Pat. No. 4,956,782 and British Specification 22 35 656 disclose semi-dynamic weighing. A user station arranged upstream in a mail flow can be a scale and a user station arranged downstream can be a postage meter machine. A continuously moved piece of mail must be completely accepted by the scale for the measuring time required for the weight determination. Given mixed mail, the probability is greater that the scale has determined an incorrect measured result. Dependent on the dimensions of the letter, the measuring time is lengthened. Alternatively, the weighing length could in fact be increased and a reject compartment could be provided, however, this would increase the length of the overall mail processing system, which is not possible without significant refitting. If incorrectly measured letters are not to be rejected, the conveying speed of the letters on the scale must be reduced. A complicated control and controllable motors are required for this purpose.

According to European Application 514 107, transport is interrupted by a control means given large pieces of mail that are difficult to weigh, until the measurement is stable. A detector is arranged in the scale close to the conveyor belt at a downstream location, this detector only allowing letters to pass for which the weight has been identified before reaching the detector. Given unequally distributed mass in the letter and high conveying speed, measuring errors occur. Moreover, the letter can slide off the weighing pan due to its inertia given a stoppage. The dimensions of the weighing pan are therefore designed somewhat greater or the conveying speed is fixed lower that would otherwise be necessary. The throughput given mixed mail is correspondingly reduced.

German Published Application 37 31 494 (U.S. Pat. No. 4,753,432) discloses that the weighing procedure include an idle time for the actual weight measurement, whereby the operation of the franking system and the transport system are interrupted because continued operation would otherwise supply too large a vibration. The conveying time from the weighing location to the postage meter machine is selected short, however, the speed cannot be arbitrarily increased without increasing the risk of jamming. The item output that can be achieved is limited by pauses introduced into the executive sequence. The speed of the weighing is limited by the speed of the weight determination. The latter factor presents a greater outlay given heavy pieces of mail when the measurement must be exact.

German Published Application 7 31 508 (U.S. Pat. No. 4,787,048) discloses that a weight estimation be undertaken when weighing. Proceeding from weight-graduated postage fee schedule tables, a first approximation is initially undertaken to assign the weight item to one of the weight categories and the separation thereof from a next category is identified. If the separation is adequately large, then this first approximation can be employed in order to determine the postage fee.

A method for dynamic weighing is known wherein interpretation of successive maximums takes place, with the weight value being formed from a difference derived from the first maximum and the quotient of the difference between the first maximum and the second maximum, and a value that is dependent on the system-inherent damping and on the period duration (Goldner, Hans, Leitfaden der Technischen Mechanik: Statistik, Festigkeitslehre; Kinematik, Dynamik, Chapter 6.2.2, Freie Schwingungen gedampfter Systeme, pages 599 through 606, VEB Fachbuchverlag Leipzig 1986, revised 9th edition). A disadvantage of this procedure is that one must wait at least half the period of a possibly-occurring harmonically decaying vibration. Since the curve form in practice, however, is not always ideal, the actual period duration can only be derived after several periods. A high degree of measuring uncertainty exists given measuring curves that do not proceed ideally.

None of the aforementioned solutions have any possibility for adaptation to a mail processing system that operates with a high throughput of postal matter. Due to the different conveying speeds, a modified behavior of the piece of mail during transport across the weighing device can occur. The piece of mail deforms more greatly at the edges during handling, air cushions are differently formed, impacts are later exerted on the weighing device, etc. Due to the mass moment of inertia, a piece of mail retains motion longer after transfer from a delivery means if the delivery does not ensue exactly. A different curve form of the measured curve for the measured weight values thus occurs as a result and, given a higher conveying speed, fewer measured weight values are available given the same structural length of the scale.

SUMMARY OF THE INVENTION

An object of the present invention is to provide a method for determining a weight with a dynamic scale and a dynamic scale operating according to the method wherein the aforementioned disadvantage of known methods and devices are avoided.

A further object is to undertake a parameter-controlled weighed value evaluation that is optimized in terms of calculating time when the dynamic scale is to be adapted for a system having a different conveying speed, particularly a higher conveying speed.

The above object is achieved is achieved in accordance with the principles of the present invention in a dynamic scale, and a method for operating a dynamic scale, wherein the dynamic scale includes a conveyor for transporting postal items through the scale to and from a weighing cell in the scale, and wherein a number of measured weight values are obtained for each postal item from the weighing cell and are evaluated by selecting one of the measured weight value, which is in the middle of the number of measured weight values, for comparison to at least one overload limit value in order to determine whether an overload situation exists, and wherein a decision parameter is formed from the measured values for comparison to at least one shutoff criterion in order to determine whether the number of measured values are valid measurements. Given no overload, and given validity of the measured values, a weight value obtained from the measured weight values and is communicated from the scale as a valid weight value for subsequent use in calculating postage for the weighed postal item.

Inventively, the evaluation of the measured weighing result ensues with the goal of simultaneously achieving measurements which are as exact as possible with optimum rapidity. An output of measured values from the weighing cell and storage thereof in a memory area of a memory ensue constantly in the scale. A first parameter indicates the number of memory cells in the memory for the measured values. The memory cells in the memory area are interconnected either by software or hardware as a shift register for a microprocessor. The microprocessor is programmed, upon input of the measured values, to undertake a sorting of the valves according to their magnitude and to store them in the corresponding locations of the shift register.

A measuring time interval ends when a leading letter edge is recognized at the letter discharge by a sensor. Initial values and parameters for the interpretation of the measured values are stored in the memory areas of a non-volatile memory. For evaluation, an average measured value is first selected from the magnitude-sorted measured values in a calculating time interval, and this average is compared to the limit values for the individual ranges of measurement. Upward transgression of the highest limit value indicates an overload error, and the limit values are checked for a downward transgression to determine whether the difference value of the smallest from the largest measured value lies in a predetermined range whose size corresponds to the allowable vibration of the weighing pan loaded with a specific weight. The measurement is considered invalid when the difference value is larger than the predetermined range. After checking the validity of the measurement, a correction of the weighed value is implemented with an offset value and a value correction factor, and forwarding of a corrected weight value to the postage meter machine ensues.

The inventive method for determining a weight with a dynamic scale is adapted to other conveying speeds because each time a measured weight value corresponding to the weight of the piece of mail is identified, the conveying speed is measured with a suitable sensor and a set of parameters is prescribed for the evaluation of the measured weighing result, the parameter set being appropriate for one of a number of conveying speed ranges. An even better adaptation is achieved by an interpolation of parameter sets given intermediate speeds.

The scale includes a conveyor, a weighing pan, a weighing cell, sensors, interfaces as well as an electronic control unit that, in addition to undertaking a control of the conveyor, evaluates measured values communicated from the weighing cell, corrects the measured values on the basis of specific parameters and forwards an output identifying a corrected weight value to the postage meter machine via an interface, and which, otherwise, switches the drive of the conveyor in order to be able to undertake a re-weighing, if necessary.

DESCRIPTION OF THE PREFERRED EMBODIMENTS

Figure 1:
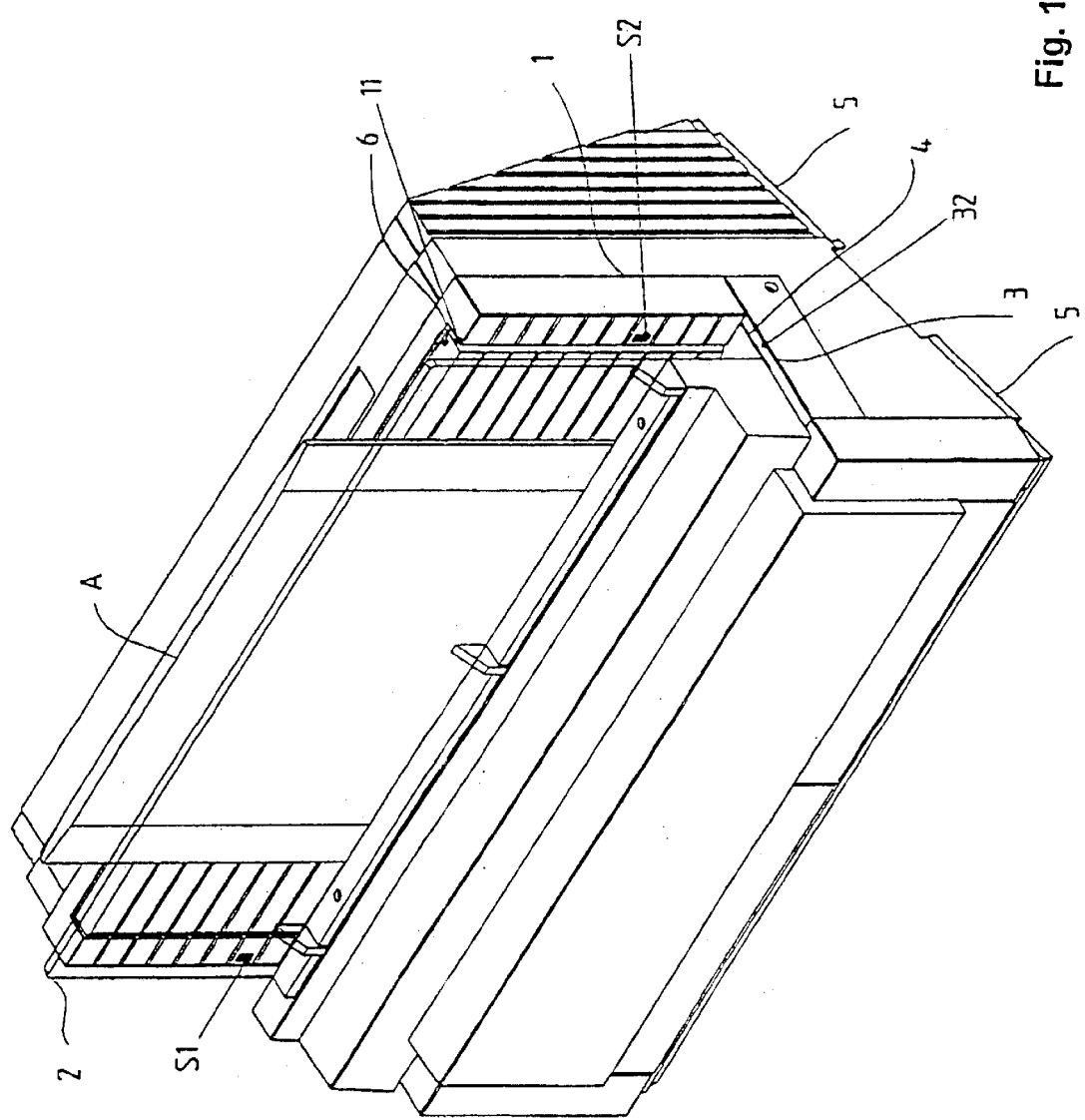
FIG. 1 is a perspective view of an inventive dynamic scale from the right front.

FIG. 1 shows a perspective view of a dynamic scale 10 that is fashioned for the transport of letters or other pieces of mail A standing on edge. The term "letter" will be used below as a generic representative of any type of item to be shipped or mailed. The letters A lie against a weighing pan 6 that is arranged in a recess 11 in a back guide wall 1 of the scale. Sensors S1 and S2 are arranged in the back guide wall 1 at both sides of the recess 11 for the weighing pan 6. A conveyor arrangement 4 having a conveyor belt that is moved under the sensors S1 and S2 lies at the level of the lower guide wall 3. The back guide wall 1 is inclined slightly toward the rear of the scale 10, preferably by 18° beyond the perpendicular. This corresponds to an optimization angle already determined for an automatic letter delivery and a postage meter machine (see German PS 196 05 014 and German PS 196 05 015. The lower guide wall 3 is arranged orthogonally relative to the back and also relative to the front cover plate 2. A defined letter position and a smooth adaptation to the preceding and following devices are thus achieved. The front cover plate 2 is composed, for example, of plexiglass. The back end 32 of the lower guide wall 3 fashioned as an adaptor to a downstream-disposed postage meter machine is fashioned in the letter discharge region of the scale 10 so that the letter A initially is unsupported when it leaves the conveyor belt 41. All the assemblies or parts are secured on a chassis 5 via corresponding intermediate pieces. A motor 49 for driving the conveyor is disposed within a lower part of the scale housing. The weighing pan 6 exhibits a resiliency that damps impacts and vibrations given heavy pieces of mail. For example, a DC motor of the type M42×15 Gefeg-Antriebstechnik is suitable as the motor 49. Further details regarding the structure of the scale can be derived from German Patent Application P 198 33 767.1-53.

Figure 2:
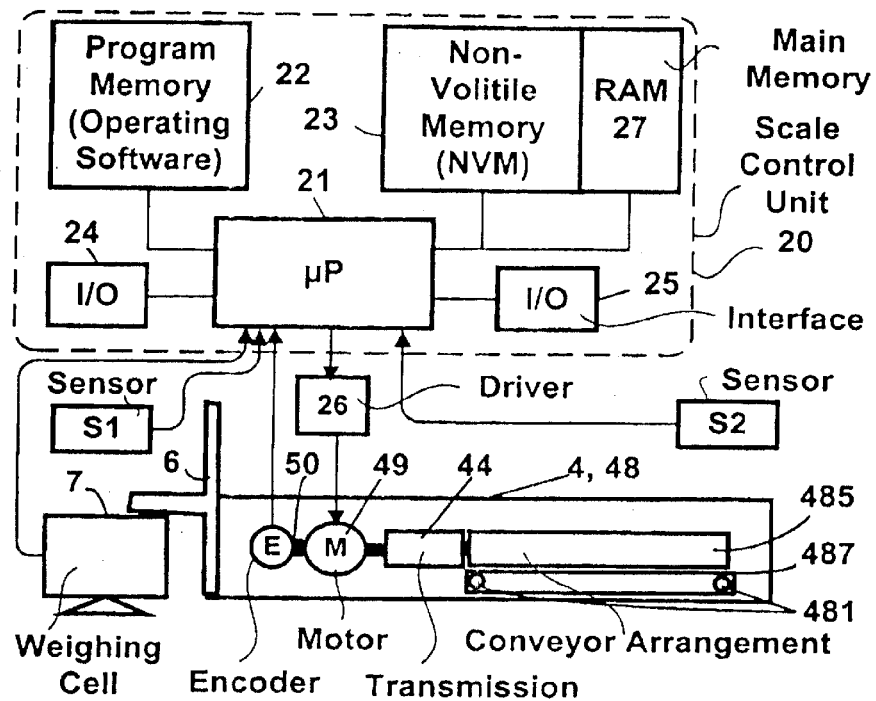
FIG. 2 is a block circuit diagram of the controller of the inventive dynamic scale.

FIG. 2 shows a block circuit diagram of the controller 20 of a dynamic scale 10 that includes a microprocessor 21 that is connected to a program memory 22, a non-volatile memory 23, a main memory 27 as well as to an input interface 24 and an output interface 25. The microprocessor 21 is operationally connected to a motor 49 of the conveyor arrangement 4 of the scale 10 via a driver 26, and is connected to an encoder 50 and to sensors S1, S2 as well as to a weighing cell 7 in order to receive sensor signals, encoder signals and weight data and in order to formulate and send control instructions to the conveyor arrangement 4. The conveyor arrangement 4 preferably contains a DC motor 49 that is supplied with DC pulses, with a specific speed being set on the basis of the ratio of pulse length to pulse pause.

The controller 20 of the dynamic scale 10, dependent on the evaluation of the weight measurement, allows transport of the letter A downstream to a postage meter machine or undertakes a switching for re-weighing.

In the operating mode for dynamic operation of the scale 10, the conveyor arrangement 4 executes a forward movement of the appertaining letter A within the scale 10 downstream with a constant speed for lightweight letters, and this speed does not exceed the conveying speed in the further processing station. By using a driver 26 which can switch the polarity of the output pulses, the driver 26 being connected between the DC motor 49 and the controller 20, the conveying direction in the scale 10, with appropriate control, can be reversed in a second operating mode by changing the polarity of the pulsed voltage applied to the motor 49. The motor 49 is connected to the drive roller 485 via a suitable transmission 44. The transmission 44 can be a gear transmission or a belt transmission. A belt (not shown) runs on the conveyor arrangement, this being tensioned with tensioning elements 48, 481, 487 opposite a spring bias (not shown).

In another embodiment the conveyor arrangement 4 has a switchable drive and the controller 20 includes the driver 26 and the conveying direction of the scale 10 can be reversed in order to implement a re-weighing in the second operating mode.

The non-volatile memory 23 has a number of memory areas B1 through Bn for, among other things, specific parameters for the weight determination. The parameters are initial values for basic settings specifically associated with scale types. Initialization via an interface of the scale 10 can be undertaken in an initialization phase. Alternatively, basic settings are undertaken in the initialization phase at the factory, for example by plugging in a pre-programmed $E^2PROM$. The parameters refer to the following quantities:

| Parameter | Quantity |
|---|---|
| P1 | predetermined plurality of measured values |
| P2 | offset factor |
| P3 | value correction factor |
| N | correction factor |
| A1 | first shutoff criterion for low weights |
| A2 | second shutoff criterion for average weights |
| A3 | third shutoff criterion for high weights |
| G1 | first overload limit value |
| G2 | second overload limit value |
| G3 | third overload limit value |

The weighing cell 7 has wire strain gauges with a connected evaluation circuit that emits digital weight data to the microprocessor 21. The sensor S1 upstream serves as an entry sensor and the sensor S2 downstream serves as a discharge sensor. A known evaluation circuit that supplies digital signals to the microprocessor 21 is connected to each sensor S1 and S2. For example, the sensors S1 and S2 can be fashioned as light barrier. The weighing cell 7 is preferably of the type HBM PW 2G of Hottinger Baldwin Messtechnik.

Figure 3:
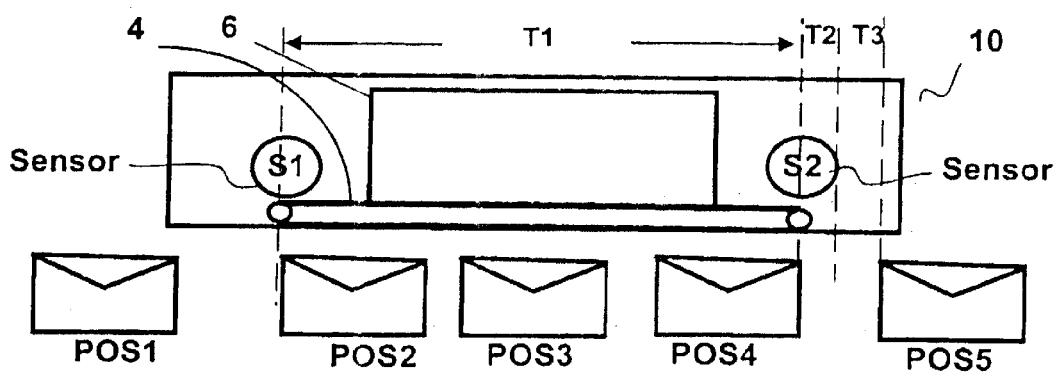
FIG. 3 illustrates letter positions in the letter stream relative to the weighing pan during dynamic weighing in accordance with the invention.

FIG. 3 shows an illustration of letter positions in the letter stream relative to the weighing pan 6 during dynamic weighing. The explanation of the functioning of the controller 20 ensues on the basis of FIG. 3 and the following table:

| Position | Action of the controller |
|---|---|
| POS1 | no action (letter is in front of the entry light barrier) |
| POS2 | start of measuring time interval, deactivate motor regulation |
| POS3 | measuring phase (letter lies completely on the weighing dish) |
| POS4 | stop of measuring time interval, determine and evaluate weight |
| POS5 | signal readiness (letter has left weighing dish) |

A letter enters into the admission light barrier and activates the sensor S1. The sensors S1 and S2 lie next to the weighing pan 6 outside the weighing region respectively upstream and downstream. As a result of this design, the weighing pan 6 can be shortened by 6 through 10% in length. This, in particular, increases the item output given dynamic weighing of lightweight pieces of mail. The speed regulation for the motor 49 is still activated in the position POS1. The position POS2 illustrates the position of a letter at the start of the measurements. A first measuring time range T1 begins with the weighing with deactivated motor speed regulation. The trailing letter edge leaves the region of the sensor S1. The position POS3 illustrates the letter position in the measuring phase. Neither of the sensors S1 or S2 is activated.

The position POS4 illustrates the position of a letter at the end of the measurements. The leading letter edge reaches the region of the sensor S2. The measuring time interval is ended given activation thereof.

A second calculating time range T2 follows, wherein a check is made to determine whether the weight of the letter A was correctly identified in addition to interpretation of the measurement, so that the piece of mail can be conveyed downstream to the postage meter machine in a third reaction time range T3. The letter A leaves the scale 10 in the position POS5. Beginning with the reaction time range T3—during which the center of gravity of the letter A usually has not yet left the weighing pan 6—, the letter A can still be conveyed back onto the weighing pan 6 with the switchable conveyor arrangement 4. The speed regulation for the motor 49 is re-activated beyond the measuring time range T1.

The evaluation circuit connected to the weighing cell 7 constantly emits digital signals to the microprocessor 21, for example every 0.010 seconds. The microprocessor 21 receives a signal from the sensor S1 when the trailing letter edge leaves the region of the sensor S1 and the measuring time range T1 begins. At the same time, the speed regulation of the motor 49 is deactivated. Dependent on the letter position, or from a suitable point in time, a number of measured values M1, . . . , Mn predetermined by the parameter P1 are obtained. The measured values are preferably stored in a shift register. The parameter P1 defines the number of places of the shift registers that stores the successively arriving measured values. When the discharge position of the leading edge of the letter is reached, the places defined by P1 are read out in parallel and processed digitally. Given 15 places that are read out, the measuring time range T1 is approximately 0.150 seconds.

Other memories can also be utilized as an alternative to the shift register. The parameter P1 serves, for example, for presetting a backward counter that is realized in terms of hardware/software in the controller 20. The measuring time range T1 ends when the count value zero is reached (at P1=15 after approximately 0.1500 seconds). In the meantime, the microprocessor 21 has stored a sequence of the predetermined number of weighing values (15 measured value data) in a memory area of the non-volatile memory 23 and these values can now be read out.

It is advantageous for the microprocessor 21 to already undertake a sorting when reading in the measured values, because a following calculating time T2 is then shortened.

Figure 4:
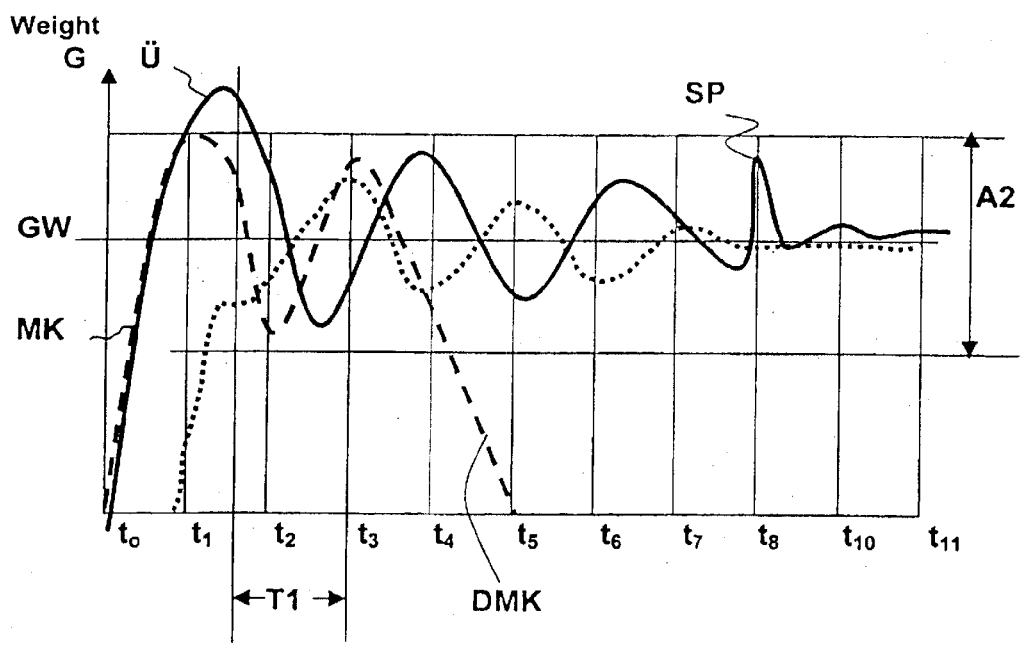
FIG. 4 is a time diagram showing the transient response of the inventive scale.

FIG. 4 shows a time diagram for the transient response of the scale 10. The measured curve MK shown with a solid line occurs when a piece of mail dwells longer on the weighing pan 6. A measured curve that is actually measured can be considerably deformed (shown dotted) and deviates from the ideal shape. Given dynamic weighing, the letter A will leave the weighing pan 6 earlier, so that the dynamic measured curve DMK (shown with a dashed line) occurs in the ideal case. The weighing precision is empirically dependent on the vibrational behavior of the scale 10, with the pre-load, the mass moment of inertia, the stiffness and damping exerting the greatest influence. The measured values that proceed to the microprocessor 21 in the measuring time range T1 fluctuate around the weight value GW and are therefore further-processed according to the inventive method. Individual jolts, which are seen as noise spike SP in the measured curve MK, or DMK, must not falsify the measured result. The weight value GW is therefore determined as quickly as possible from the measured curve MK or DMK. Whether continued weighing is still worthwhile in view of disturbances should be recognized early. In the illustrated example, the first overshoot of the measured curve MK lies above the second shutoff criterion A2 for medium weights. The measured curve is interpreted with two windows (time and weight window). The first overshoot Ü of the measured curve MK above the second shutoff criterion A2 for medium weights is interpreted as an error when it occurs within the two windows. The windows are located in a region of the measured curve MK or DMK in which the first overshoot has already decayed.

A further condition is that the series of measured values M1, ..., Mn lies in the weight window A2 during continued transport. A weight window A2 is defined for medium weights (approximately 500 g). The first measured values of the measured curve DMK already lie in the measuring time range T1 and the weight range of the second shutoff criterion A2 and thus yield valid measured values. The microprocessor 21 now has the series of measured values sorted according to size stored in a further memory area B2 of the non-volatile memory 23. The measuring time range T1 is followed by a second calculating time range T2 wherein an evaluation of the measurements ensues.

Figure 5:
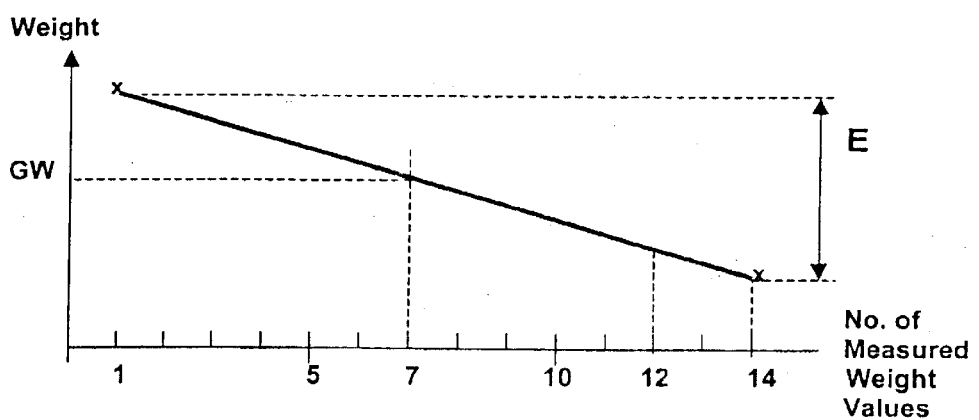
FIG. 5 illustrates sorted weight values in accordance with the invention.

The sorted weight values shown in FIG. 5 serve the purpose of illustrating the further executive sequence. The first sorted weight value is the highest. It is not necessarily the first measured value measured in the time interval T1 but, for example, can be caused by a noise spike. The sorting ensues according to the magnitude, so that the last sorted weight value is the smallest. Given 14 sorted weight values, the seventh then yields a measured value $M_m$ lying in the middle that usually corresponds to an average value but only in a rough approximation, and may possibly deviate substantially from such an average value. The illustrated straight line idealizes the actual curve of the graduation. The reduction of the magnitude of the weight values, of course, is not linear in reality; the seventh of the sorted weight values thus cannot yet be considered to be the ultimate measured value.

Figure 6:
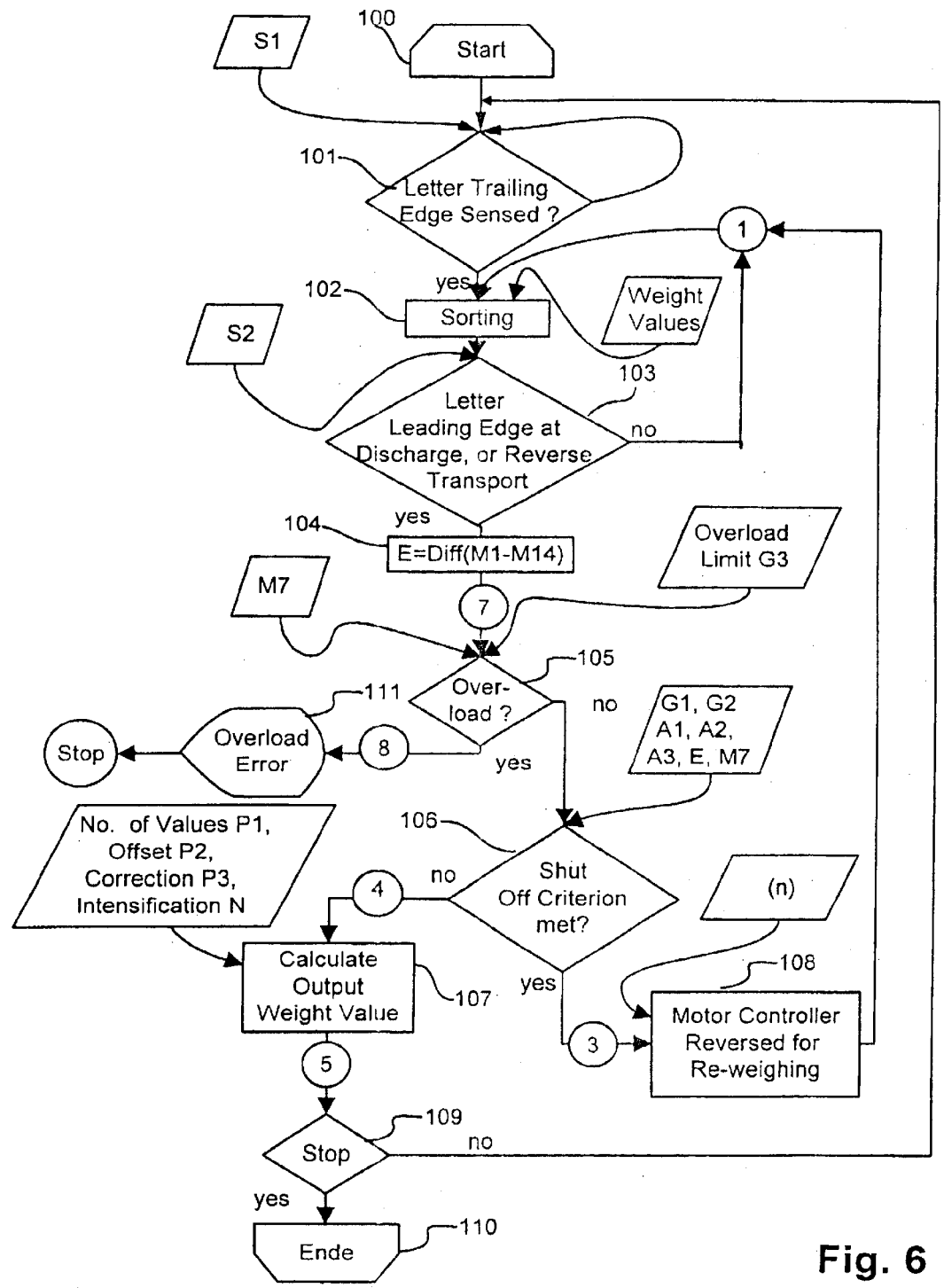
FIG. 6 is a flowchart for the control of the scale in accordance with the invention.

FIG. 6 shows the flowchart for the control of the scale 10. The microprocessor 21 can identify the leading letter edge with the sensor S1 at the letter admission and starts the weight determination (in step 100). Measured weight values are constantly supplied by the weighing cell 7. The microprocessor 21 has recognized the trailing letter edge with the sensor S1 at the letter admission (in step 101) and starts the sub-program of sorting (in step 102), this being explained in greater detail on the basis of FIG. 7. After a time interval, the microprocessor 21 recognizes the leading letter edge with the sensor S2 at the letter discharge 32 (in step 103). The time range that has elapsed for acquisition of the number of last measured values predetermined by the parameter P3 is referred to as the measuring time range T1. The microprocessor 21 now forms a decision parameter E in step 104 as a difference value between the sorted, largest and smallest value and starts the interrogation for at least one overload in the step 105. The measured value M7 is compared to the highest overload limit value G3. Any potential overload error which may arise is further-evaluated (in step 111) and the scale 10 is stopped. If it is found that no overload exists, then a determination is made in a further interrogation step 106 as to whether the value is valid or invalid. A sub-program that is explained in greater detail on the basis of FIG. 8 is called for this purpose. The difference value E from the first sorted measured value M1 and the fourteenth sorted measured value M14 should be within the weight range of one of the shutoff criteria A1, A2 or A3. For example, if it is within the range defined by the second shutoff criterion A2 it thus yields valid measured values. In this circumstance, since none of the shutoff criteria is met, a branch can now be made to the step 107 for the determination of the weight value, a sub-program being called therein that is explained in greater detail below with reference to FIG. 10. Otherwise, given invalid measured values, a branch is made to the step 108 wherein the motor controller 20 is reversed in order to initiate the return transport of the letter into the weighing position and in order to initiate a re-weighing. The speed n is identified by the encoder 50 and can be employed for speed control. A branch is then made back from step 108 to the step 102 for sorting. If the scale 10 is not stopped (for example, manually), which is interrogated in step 109, then a branch is made back from the step 109 to the step 101. Given an identified stop command, the end of the operation of the scale 10 is reached (step 110). Given a successful weight determination in step 107, the transfer of the weight result to the postage meter machine ensues in a sub-step (step 107-5).

Figure 7:
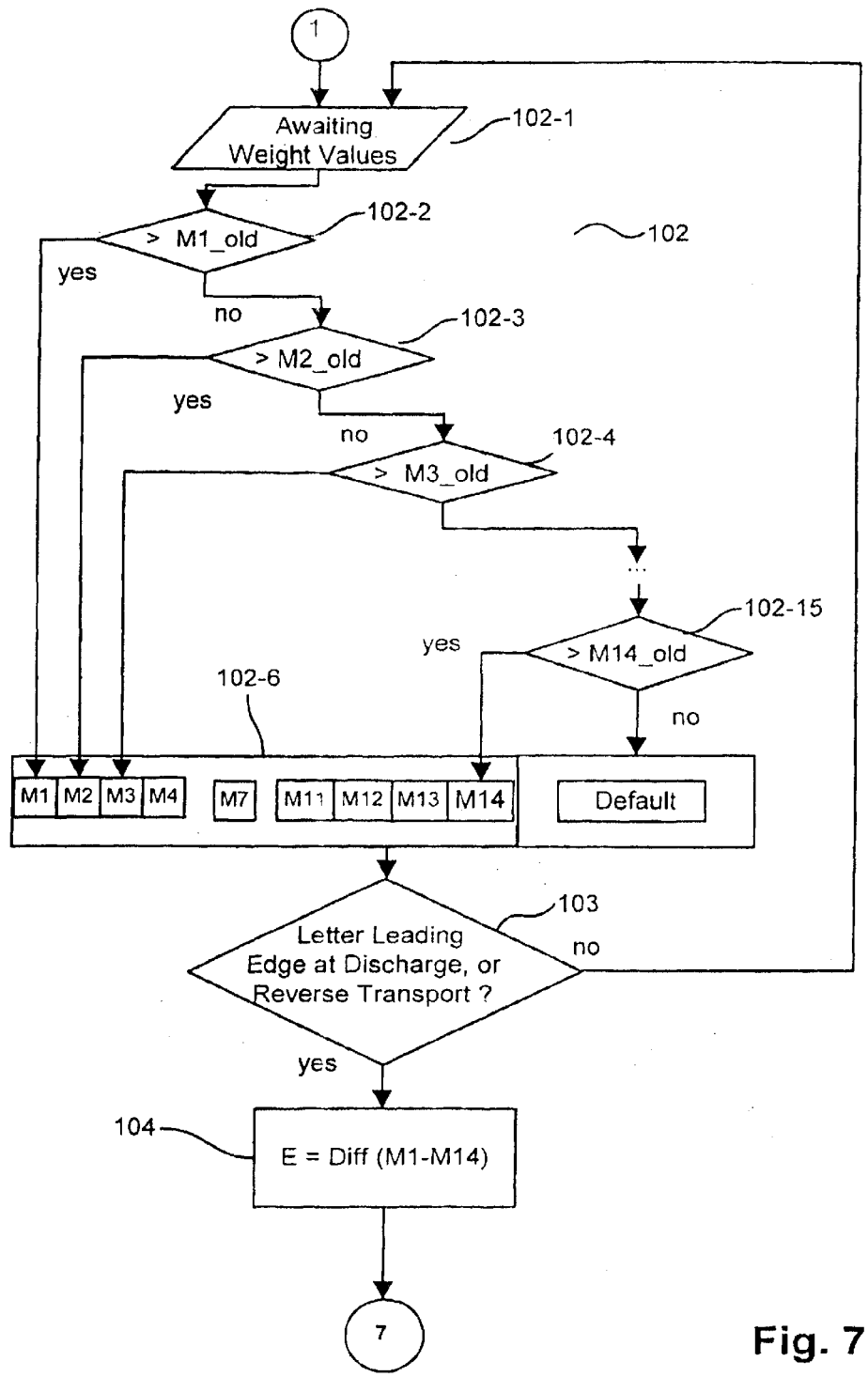
FIG. 7 is a flowchart of a sub-routine for sorting in accordance with the invention.
Figure 8:
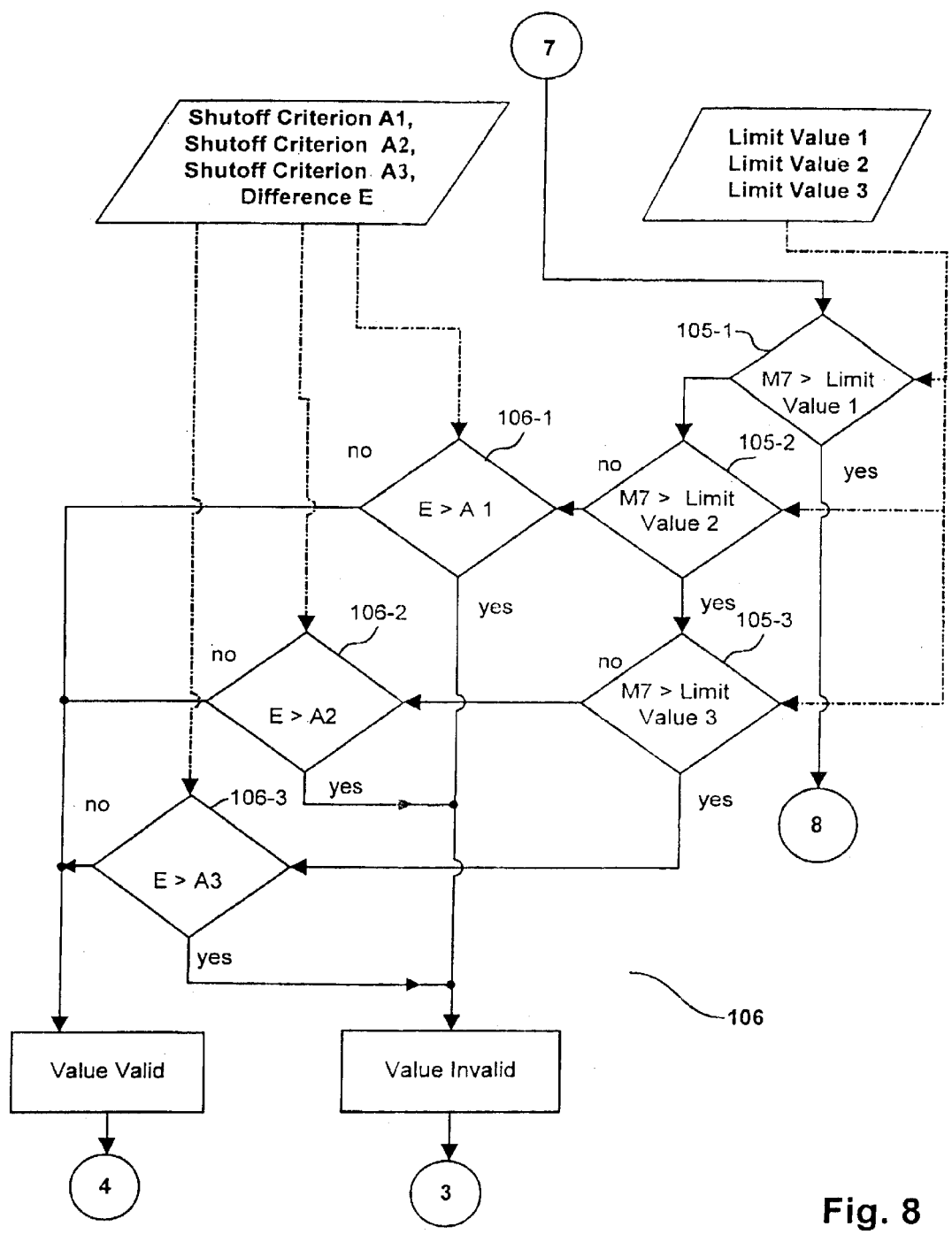
FIG. 8 is a flowchart for a sub-routine overload and shutoff criterion in accordance with the invention.

FIG. 7 shows the sub-routine flowchart of sorting. In a first sub-step 102-1, the receipt of weighing values is awaited. The weighing values that are received successively pass through the interrogation steps 102-1, 102-3, 1024, ..., 102-15, wherein the incoming values—in each interrogation step—are respectively compared to one of the preceding measured values M1_old, M2_old, ..., M14_old. If the new measured value is higher than the preceding measured value, a branch is made from the respective interrogation step to a step 102-6 for storing the sorted measured values in the shift register. In the interrogation step 103, the microprocessor 21 determines, on the basis of a signal from the sensor 52 whether the sorting must be continued or can be ended. When the leading letter edge at the discharge is detected by the sensor S2 or when the return transport is initiated by the controller 20, then a branch is made back to the sub-step 102-1 for sorting. Otherwise, a branch is made to the next step 104 with which the interpretation of the measured values begins. The magnitude of the first measured value M1 and the last (fourteenth) measured value M14 are taken from the shift register in the step 104 and a difference E is formed by subtracting one from the other. The difference E is intermediately stored and is available in the calculating time interval T2 for the interpretation of the measured values.

Figure 9:
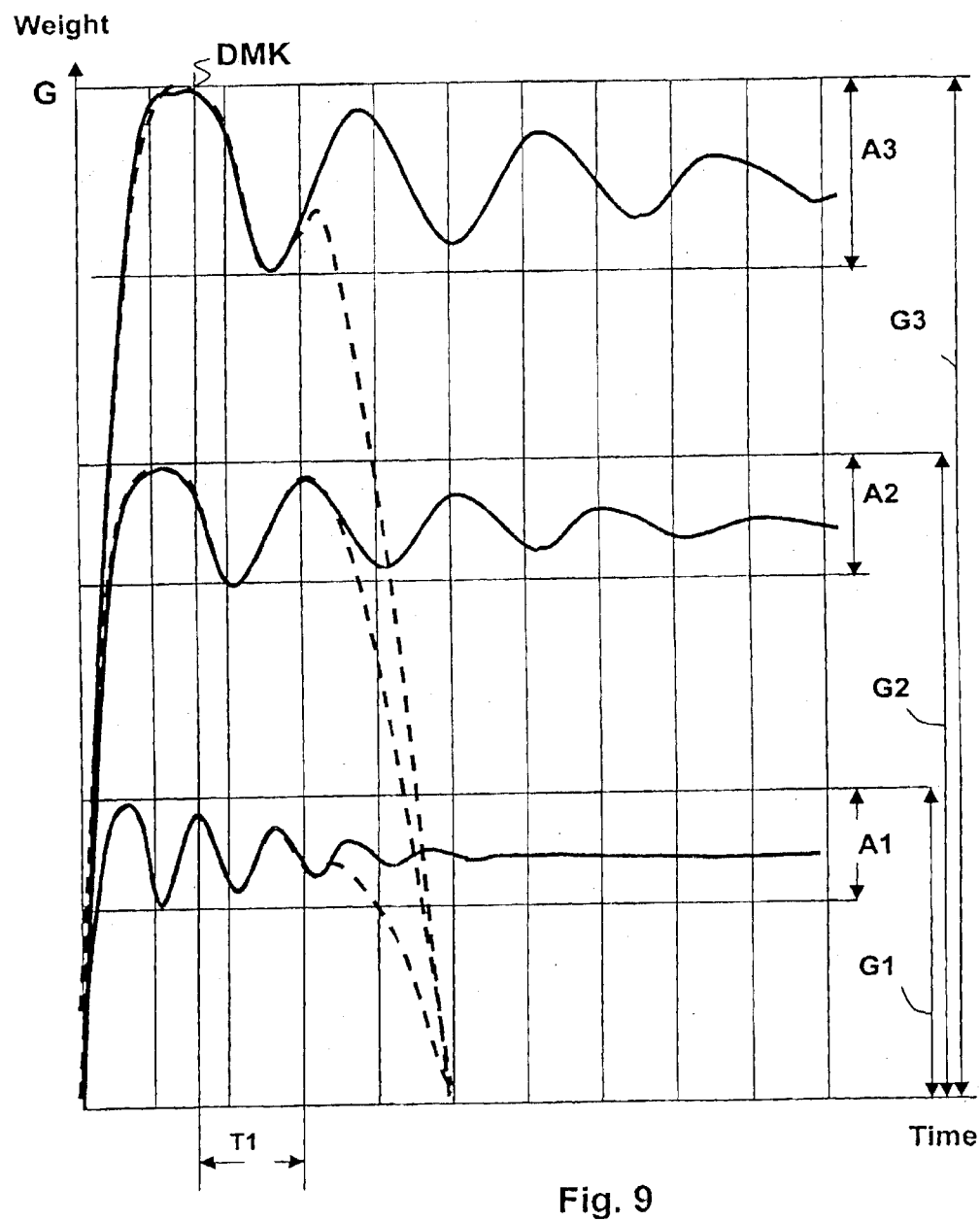
FIG. 9 is a time diagram for the transient response of the inventive scale given three different postal matter weights.

FIG. 8 shows the sub-routine flowchart of overload and shutoff criterion. In the interrogation steps 105-1, 105-2, 105-3, the seventh measured value is compared to respective limit values G3, G1 and G2. In this way, the weight category to which the measured values can be assigned can be identified. If the seventh measured value M7 is larger than the third limit value G3, then an overload is identified and the point 8 is reached. Otherwise, M7<G3 applies and a check is now carried out as to whether the seventh measured value is larger than the first limit value G1. If this is the case, G1<M7<G3 exists, and a check is made as to whether the seventh measured value is larger than the second limit value G2. If this is the case, G1<G2<M7<G3 applies, and a branch is made to the interrogation step 106-3. According to interrogation step 106-3, the difference E must not be larger than the third shutoff criterion A3 for the acquired measured values are to be valid. Otherwise, a branch is made from the interrogation step 105-2 or 105-3 to the interrogation step 106-1 or 106-2, respectively. In the interrogation steps 106-1, 106-2, 106-3, the difference E is respectively compared to the shutoff criteria A1, A2 and A3. If the difference E is larger than the respective shutoff criterion A1, A2 or A3, then the measured values are invalid (point 3). The measured values are valid (point 4) when the difference E lies within the shutoff criterion A1, A2 or A3. FIG. 9 explains the terms "limit values" and "shutoff criteria".

FIG. 9 shows a time diagram relating to the transient response of the scale 10 given three different weights of postal matter. Given a high limit value G3 of a first weight G of a piece of mail for an upper weight category, the transient response of the scale 10 usually proceeds in a range A3 that serves as the shutoff criterion. For postal matter weights of a medium weight category up to a limit value G2, a different range A2 is valid as the shutoff criterion. A further range A1 is valid as the shutoff criterion for postal matter weights of a lowest weight category up to a limit value G1.

Figure 10:
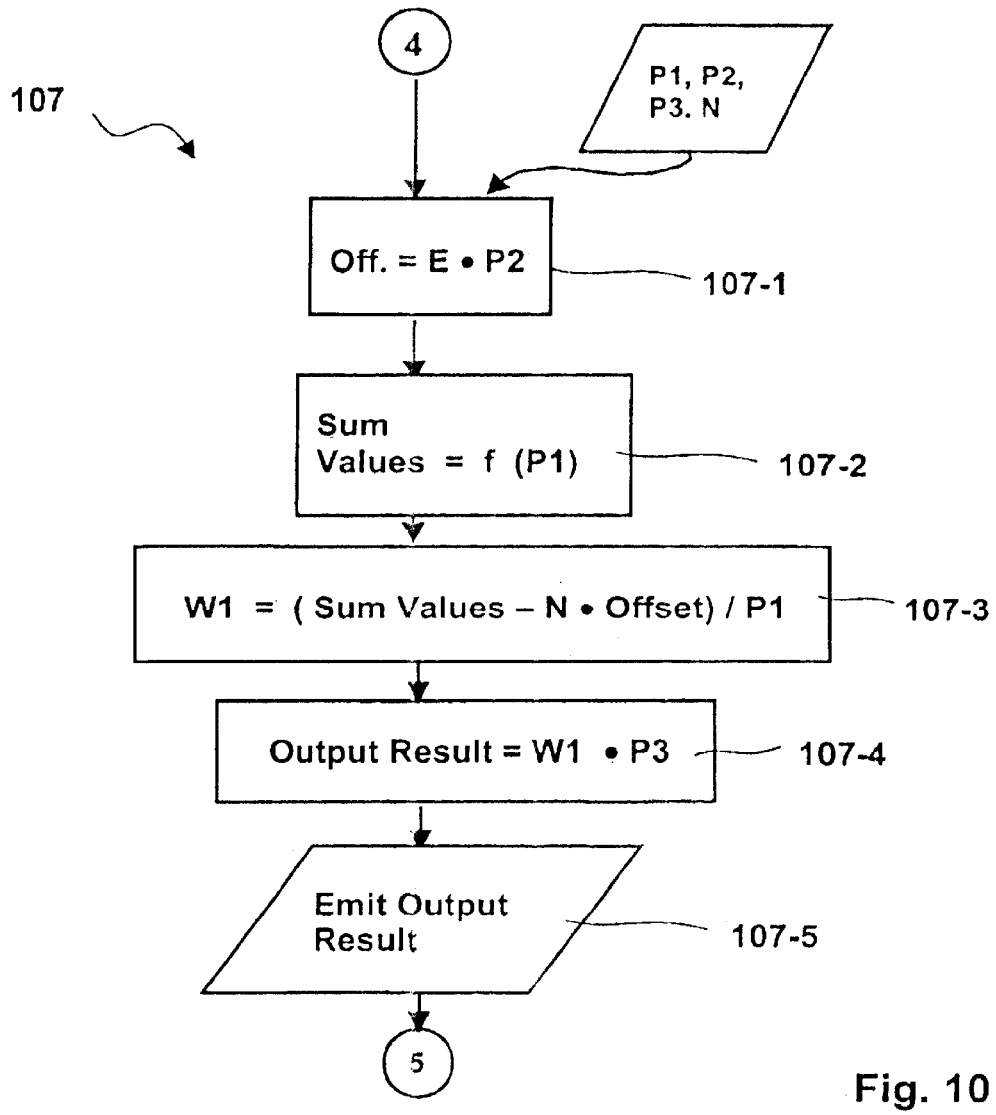
FIG. 10 is a flowchart for a sub-routine for determining weight value in accordance with the invention.

FIG. 10 shows the sub-routine flowchart for determining the weighing value. In the first step 107-1, the intermediately stored difference value E and a parameter P2 are called and multiplied with one another. The parameter P2 may be a negative value. The product of P2 and E yields an offset value that is required, among other things, in order to compensate an offset of the weighing cell:

$$OFFSET = E \cdot P2 \qquad (1)$$

In the second step 107-2, the intermediately stored measured values M1 through Mx are added, whereby x is defined by the parameter P1 and, for example, amounts to the value 14. The following is valid for 14 measured values (14 measured values being preferable):

$$\sum = f(P1) = \sum_{X=1}^{14} Mx \qquad (2)$$

A weighing value W1 that approximately corresponds to the average value of the measured values thus can be formed as the sum of all values after an offset correction with the division by the number of values (parameter P1). The offset correction can be intensified by a factor N (1 through 5) if the identified weight category requires this. The following thus derives for the weighing value W1:

$$W1 = \left\{ \sum_{X=1}^{14} -(N \cdot OFFSET) \right\} / P1 \qquad (3)$$

In order to obtain the specific weight value W as result, this being communicated to the postage meter machine arranged downstream, the weighing value W1 is also multiplied by a value correction factor P3 at the end of the calculating time range T2:

$$W = P3 \cdot W1 \qquad (4)$$

Dependent on the evaluation of the weight measurement in the first operating mode, the controller 20 of the dynamic scale 10 undertakes switching into a further operating mode that initiates the transport of the letter A to the further processing station downstream when a corresponding presetting of the controller 20 of the dynamic scale 10 allows a correct weight value to be set instead of the actual weight value given an imprecise measurement. The corrected weight value can deviate from the actual weight value within a range.

The above procedure is summarized by sorting (step 102) the measured values according to their size in the measuring time interval T1 before the selection of the measured value time interval T1 before the selection of the measured value $M_m$ lying in the middle, formation (step 104) of the decision parameter E from a difference of sorted measured values, determination (step 105) in the calculating time interval T2 that the measured value $M_m$ lying in the middle from the sorted measured values is within certain limits G1, G2, G3, further-processing (step 106) of the valid measured values, whereby the latter are valid when the decision parameter E does not exceed respective shutoff criteria A1, A2, A3, and output (step 107) of a corrected weight value W.

During further-processing of the measured values, their correction ensues on the basis of specific parameters P2, P3. Printing of postage that corresponds to the corrected weight value then ensues with the postage meter machine, this postage being higher by an amount or factor P2, P3 than the identified, probably imprecise, value. This only has consequences when the actual weight value lies in the proximity of the boundary between one postage range and another in the rate table—the piece of mail would then be over-franked—or when the probably imprecisely detected value is grossly incorrect. In the latter instance, a re-measurement can be initiated insofar as no plausible value can be found. When the measured values are valid, an automatic switching into the semi-dynamic operation of the scale ensues. The letter A is conveyed back into the weighing position and then can be re-weighed without being moved.

During dynamic operation, a correction of the measured value on the basis of specific parameters P2, P3 is implemented during the transport of the letter A before it is emitted as the corrected weight value W. The same weighing cell 7 supplies a measured weighing result dependent on the conveying speed. The evaluation circuit weighing cell 7 constantly outputs digital signals to the microprocessor 21, for example every 0.010 seconds, and fifteen measured value data can be stored in the measuring time range T1. The measuring time range is shortened to a measuring time range T1' given a higher transport speed. Given a constant clock frequency, more weighing values are available at the slow transport speed than given a high speed. The evaluation of the weighing values expediently ensues in a manner that is optimized by the selection of a suitable evaluation method and the selection of suitable parameters for the control of this evaluation. The employment of the same evaluation method is assumed in order to realize a parameter control by means of suitable parameter selection. It is also provided that the conveying speed is measured with a suitable sensor at all times. The encoder 50, for example, is mechanically coupled to the drive shaft of the motor 49 and delivers a signal to the microprocessor 21.

Theoretically, there is an optimum parameter selection for each conveying speed with which the measured weighing result can be further optimized. The number of intermediate speeds between the minimum and the maximum conveying speed leads to a field of parameter characteristics. This field of parameter characteristics includes sets of parameters respectively allocated to the possible conveying speeds. Interrelated parameters are referred to as a parameter set.

Given limited memory space but unlimited number of speeds, this parameter variation cannot be converted in an optimized manner in terms of calculating time. For this reason, a limited number, for example three representative speeds, is prescribed for achieving the additional object of the invention in the preferred embodiment. A respective parameter set is deposited in the program memory 22 (EPROM) for each speed. In this way, three speed ranges V1, V2 and V3 are prescribed.

| Character | Parameter | V1 up to 0.3 m/s | V2 up to 0.4 m/s | V3 up to 0.7 m/s |
|---|---|---|---|---|
| P1 | plurality of measured values | 20 | 14 | 10 |
| P2 | correction value 1 | 0 | 0.3 | 0.5 |
| P3 | correction value 2 | 1 | 0.9995 | 0.9993 |
| N | correction factor | 1 | 2 | 3 |
| A1 | shutoff criterion 1 | 8 | 10 | 15 |
| A2 | shutoff criterion 2 | 12 | 15 | 25 |
| A3 | shutoff criterion 3 | 20 | 30 | 45 |
| G1 | limit value 1 | 299 | 299 | 299 |
| G2 | limit value 2 | 699 | 599 | 499 |
| G3 | limit value 3 | 1700 | 1500 | 1200 |

In the initialization phase of the dynamic scale, the conveying speed is entered for the system in order to be able to pre-set the evaluation parameters on the basis thereof. A correspondingly selected parameter set having initial values and parameters (P1,P2,P3,G1,G2,G3,A1,A2,A3,N) for the interpretation of the measured values is then stored in the memory areas of the non-volatile memory 23.

Moreover, a further adaptation can be provided during the operation of the system. Since the conveying speed is measured with the encoder 50, or some other suitable sensor, at all times T1, T2, T3, a switching of parameter sets can ensue after the measuring time interval T1. A modification of the conveying speed due to slippage or external regulation thus leads to adaptation of the weighing value interpretation and the optimization thereof. Given high throughput of postal matter, for example 4000 items of 100–400 g letters in the format C6 through B4 given the velocity V3=0.7 m/s, a high measuring dependability and independence from external disturbances are nonetheless established.

On the basis of an interpolation of parameter sets at intermediate speeds, a further embodiment enables an even better adaptation. If a speed limit is exceeded during operation, then the parameter set that is optimum for the current speed range is automatically accessed. When a new parameter set is calculated parallel to the measurement by interpolation in the measuring time interval, a switching to the new parameter set can ensue after the measuring time interval T1, and thus is already available for use in the calculating time interval T2.

When a new parameter set is calculated parallel to the measuring time interval T1 and calculating time interval T2, switching to the new parameter set can only take effect for a following measuring time interval T1. After supplying the corrected weight value W to the postage meter machine, i.e. in the reaction time range T3, the switching to the new parameter set must have been terminated.

The further processing of the valid measured values and checking thereof with respect to the plausibility of a weighing value as well as, if necessary, parameter set switching ensue in a program-controlled manner by the microprocessor 21. Instead of the microprocessor 21, of course, a micro-controller or application-specific integrated circuits (ASICs) can be utilized.

The invention is not limited to the present embodiment since other embodiments of the invention can obviously be developed or, respectively, utilized, these, proceeding from the same basic idea of the invention, being covered by the attached claims.

Although modifications and changes may be suggested by those skilled in the art, it is the intention of the inventor to embody within the patent warranted hereon all changes and modifications as reasonably and properly come within the scope of his contribution to the art.

I claim as my invention:

1. In a dynamic scale having a weighing cell and a controllable conveyor for transporting a series of postal items to and from said weighing cell, a method for operating the dynamic scale comprising the steps of:

for each postal item, obtaining a plurality of measured weight values from said weighing cell as said postal item is transported across said weighing cell without stoppage;

selecting one of said measured weight values, as a middle value, which is substantially in the middle of said plurality of measured weight values;

comparing said middle value to at least one overload limit value to determine whether an overload exists;

forming a decision parameter from measured weight values in said plurality of measured weight values;

comparing said decision parameter to at least one shutoff criterion to determine whether said plurality of measured values is valid; and given no overload and given validity of said plurality of measured values, forming and emitting an output weight value from said scale, dependent on said plurality of measured values.

2. A method as claimed in claim 1 wherein each of said measured weight values has a magnitude, and comprising the steps of:

sorting said measured weight values according to magnitude in a measuring time interval, to obtain sorted values, before selecting said middle value;

forming said decision parameter from a difference between two of said sorted values;

in a calculating time interval following said measuring time interval, selecting said middle value from among said sorted values and comparing said middle value to said at least one overload limit value;

comparing said difference to said at least one shutoff criterion and determining said measured weight values to be valid if said difference does not exceed said at least one shutoff criterion; and if said measured weight values are valid, forming a corrected weight value from said middle value and emitting said corrected weight value from said scale as said output weight value.

3. A method as claimed in claim 2 comprising continuously obtaining and sorting said measured weight values according to magnitude in a memory during said measuring time interval, forming said decision parameter as a difference between a first of said sorted values and a last of said sorted values obtained in said measuring time interval.

4. A method as claimed in claim 3 comprising intermediately storing said difference in said calculating time interval, and wherein the step of comparing said middle value to at least one overload limit value comprises comparing said middle value to a plurality of overload limit values respectively defining different weight categories and thereby identifying a weight category containing said middle value, and wherein the step of comparing said difference to said at least one shutoff criterion comprises assigning respectively different shutoff criteria to said different weight categories, including a maximum shutoff criterion and determining said measured weight values as being valid if said difference does not exceed said maximum shutoff criterion and only then allowing transport of said postal item, from which said plurality of measured values was obtained, on said conveyor out of said scale.

5. A method as claimed in claim 4 wherein the step of comparing said difference to said at least one shutoff criterion further comprises comparing said difference to shutoff criteria other than said maximum shutoff criteria and dependent on a comparison result with said other shutoff criteria, re-weighing said postal item from which said plurality of measured weight values was obtained.

6. A method as claimed in claim 5 comprising defining ranges between successive shutoff criteria and comparing said difference to each of said ranges and determining that said measured weight values are invalid if said difference exceeds a range for the shutoff criterion assigned to the weight category containing said middle value.

7. A method as claimed in claim 4 comprising identifying an overload condition if said measured value is larger than a maximum of said plurality of overload limit values.

8. A method as claimed in claim 2 wherein said memory in which said sorted values are stored contains a plurality of memory cells respectively for said sorted values, and setting a first parameter which defines a number of said memory cells in said memory which are available to contain said sorted values, setting a second parameter as an offset factor and calculating an offset value as a product of said difference and said offset factor, calculating a weighing factor as a sum of all of said plurality of measured weight values, subtracting said offset value from said sum to obtain an intermediate difference, and dividing said intermediate difference by said first parameter, and setting a third parameter and forming said corrected weight value by multiplying said weighing factor by said third parameter.

9. A method as claimed in claim 1 comprising measuring a conveying speed of said conveyor and employing a parameter set, in part dependent on said conveying speed, for obtaining said corrected weight value from said plurality of measured values.

10. A method as claimed in claim 9 comprising storing a plurality of different parameter sets for respectively different discrete conveying speeds, and, if said conveying speed is between two of said discrete conveying speeds, employing an interpolated parameter set, obtained by interpolating the respective parameter sets for the discrete conveyor speeds between which said conveying speed lies, for forming said corrected weight value.

11. A dynamic scale weighing a series of postal items comprising:
a weighing cell;
a controllable conveyor for individually transporting said postal items to and from and across said weighing cell without stoppage along a transport path;
said weighing cell, for each postal item, obtaining a plurality of measured weight values as said postal item is transported without stoppage across said weighing cell; and
a controller for selecting one of said measured weight values, as a middle value, which is substantially in the middle of said plurality of measured weight values, for comparing said middle value to at least one overload limit value to determine whether an overload exists, for forming a decision parameter from measured weight values in said plurality of measured weight values, for comparing said decision parameter to at least one shutoff criterion to determine whether said plurality of measured values is valid, and given no overload and given validity of said plurality of measured values, for forming and emitting an output weight value dependent on said plurality of measured weight values.

12. A dynamic scale as claimed in claim 11 wherein each of said measured weight values has a magnitude, and wherein said controller sorts said measured weight values according to magnitude in a measuring time interval identified by said sensor, to obtain sorted values, before selecting said middle value, forms said decision parameter from a difference between two of said sorted values, in a calculating time interval identified by said sensor following said measuring time interval, selects said middle value from among said sorted values and compares said middle value to said at least one overload limit value, compares said difference to said at least one shutoff criterion and determines said measured weight values to be valid if said difference does not exceed said at least one shutoff criterion, and if said measured weight values are valid, forms a corrected weight value from said middle value and emits said corrected weight value as said output weight value.

13. A dynamic scale as claimed in claim 12 wherein said controller comprises a memory and wherein said weighing all continuously obtains said measured weight values and said controller continuously sorts said measured weight values according to magnitude in said memory during said measuring time interval, and wherein said controller forms said decision parameter as a difference between a first of said sorted values and a last of said sorted values obtained in said measuring time interval.

14. A dynamic scale as claimed in claim 13 wherein said controller intermediately stores said difference in said calculating time interval, compares said middle value to at least one overload limit value comprises comparing said middle value to a plurality of overload limit values respectively defining different weight categories and thereby identifies a weight category containing said middle value, and assigns respectively different shutoff criteria to said different weight categories, including a maximum shutoff criterion and determines said measured weight values as being valid if said difference does not exceed said maximum shutoff criterion and only then allows further transport of said postal item, from which said plurality of measured values was obtained, on said conveyor.

15. A dynamic scale as claimed in claim 14 wherein said controller compares said difference to said maximum shutoff criterion and then compares said difference to shutoff criteria other than said maximum shutoff criteria and dependent on a comparison result with said other shutoff criteria, controls said conveyor to re-weigh said postal item from which said plurality of measured weight values was obtained.

16. A dynamic scale as claimed in claim 15 wherein said controller defines ranges between successive shutoff criteria and compares said difference to each of said ranges and determines that said measured weight values are invalid if said difference exceeds a range for the shutoff criterion assigned to the weight category containing said middle value.

17. A dynamic scale as claimed in claim 14 wherein said controller identifies an overload condition if said measured value is larger than a maximum of said plurality of overload limit values.

18. A dynamic scale as claimed in claim 12 wherein said memory in which said sorted values are stored contains a plurality of memory cells respectively for said sorted values, and comprising means for setting a first parameter which defines a number of said memory cells in said memory which are available to contain said sorted values, and for setting a second parameter as an offset factor and for setting a third parameter, and wherein said controller calculates an offset value as a product of said difference and said offset factor, calculates a weighing factor as a sum of all of said plurality of measured weight values, and subtracts said offset value from said sum to obtain an intermediate difference, and divides said intermediate difference by said first parameter, and forms said corrected weight value by multiplying said weighing factor by said third parameter.

19. A dynamic scale as claimed in claim 11 comprising a sensor which measures a conveying speed of said conveyor and wherein said controller employs a parameter set, in part dependent on said conveying speed, for obtaining said corrected weight value from said plurality of measured values.

20. A dynamic scale as claimed in claim 9 comprising a memory storing a plurality of different parameter sets for respectively different discrete conveying speeds, and wherein, if said conveying speed is between two of said discrete conveying speeds, said controller employs an interpolated parameter set, obtained by interpolating the respective parameter sets for the discrete conveyor speeds between which said conveying speed lies, for forming said corrected weight value.

* * * * *

United States Patent and Trademark Office
Certificate

Patent No. 6,907,409 B1                                                  Patented: June 14, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Uwe Huebler, Berlin, Germany; and Christoph Kunde, Berlin, Germany.

Signed and Sealed this Twenty-eighth Day of March 2006.

*JOHN W. HAYES*
*Supervisory Patent Examiner*
*Art Unit 3639*